United States Patent [19]
Ravenel et al.

[11] Patent Number: 5,538,705
[45] Date of Patent: Jul. 23, 1996

[54] CARBONITRIDING OF ALUMINA TO PRODUCE ALUMINUM NITRIDE

[75] Inventors: Pierre Ravenel, Saint-Genis-Laval; Jean-Pierre Disson, Vernaison; Roland Bachelard, Lyons, all of France

[73] Assignee: ELF Atochem S.A., Puteaux, France

[21] Appl. No.: 304,845

[22] Filed: Sep. 13, 1994

[30] Foreign Application Priority Data

Sep. 17, 1993 [FR] France .................................. 93 11114

[51] Int. Cl.$^6$ .............................................. C01B 21/072
[52] U.S. Cl. ........................................................ 423/412
[58] Field of Search .................................. 423/412, 659

[56] References Cited

U.S. PATENT DOCUMENTS 5,154,907 10/1992 Kim et al. ................................ 423/412
5,370,854 12/1994 Henley et al. ........................... 423/409

FOREIGN PATENT DOCUMENTS 519806 12/1992 European Pat. Off. ............... 423/412
130003 5/1992 Japan ..................................... 423/412

Primary Examiner—Wayne Langel
Attorney, Agent, or Firm—Burns, Doane, Swecker & Mathis

[57] ABSTRACT

Aluminum nitride (AlN) is continuously produced by continuously carbonitriding a continuously replenished charge of alumina, for example successive charges of alumina/carbon extrudates, in a reaction zone comprising at least one conduit, the ratio of the exchange surface area/volume of which at least one conduit ranging from 5 to 50 m$^{-1}$, preferably from 10 to 50 m$^{-1}$, and continuously withdrawing product AlN therefrom.

12 Claims, 1 Drawing Sheet

CARBONITRIDING OF ALUMINA TO PRODUCE ALUMINUM NITRIDE

BACKGROUND OF THE INVENTION

1. Field of the Invention

The present invention relates to the production of aluminum nitride via the carbonitriding of alumina, and, more especially, to a continuous such process.

2. Description of the Prior Art

It is known to this art to produce aluminum nitride via the carbonitriding of alumina in a fluidized-bed reactor (see, for example, published European Patent Application 0,266,927, published Japanese Application 63/297,205 and published British Patent Application 87/00,208).

It is also known to this art to carry out the reaction in a rotary kiln (see, for example, published Japanese Patent Applications 62/278,109, 62/20,030 and 61/74,635).

It too is known to produce aluminum nitride in a shafted kiln fitted with a stack of travelling buckets (see, for example, published European Patent Application 0,272,377), or fixed (Japanese Patent No. 1,290,562).

These various prior art processes nonetheless present a certain number of drawbacks. On the one hand, they share the disadvantage of only a single limited production and limited productivity, since the working volume of the reactor is always low.

On the other hand, the resulting final products are generally characterized by their heterogeneity due to a wide distribution in the residence times of the reactants in the kiln. This is particularly the case for the rotary kiln and for the fluidized-bed reactor operating continuously.

It has also been proposed to carry out the reaction in a continuously operating methodical or moving-bed reactor (see published European Patent Application 0,519,806 and WO-92/16,467). These processes permit attaining a production close to one kilogram, or indeed several kilograms of aluminum nitride per hour. However, the productivity of these reactors remains low.

Thus, serious need continues to exist in this art for a high-productivity process for the preparation of AlN, while at the same time maintaining both a high level of production and a great homogeneity of the final product.

SUMMARY OF THE INVENTION

Accordingly, a major object of the present invention is the provision of an improved process for the continuous production of aluminum nitride via the carbonitriding of alumina, this reaction being carried out in a reactor, the reaction zone of which comprising at least one conduit and having an exchange surface area/volume ratio of from 5 $m^{-1}$ to 150 $m^{-1}$. Preferably, this ratio ranges from 10 $m^{-1}$ to 50 $m^{-1}$.

DETAILED DESCRIPTION OF BEST MODE AND PREFERRED EMBODIMENTS OF THE INVENTION

Figure 1A:
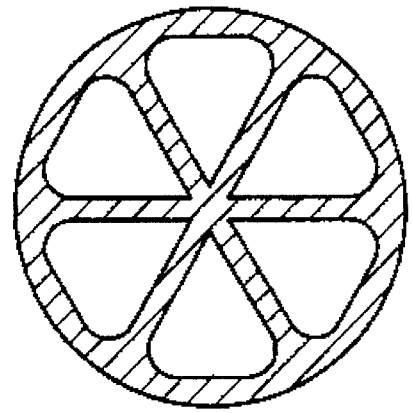
FIG. 1 illustrates, in cross section, three (3) embodiments of reaction zones for carrying out the carbonitriding reaction of the present invention.
Figure 1B:
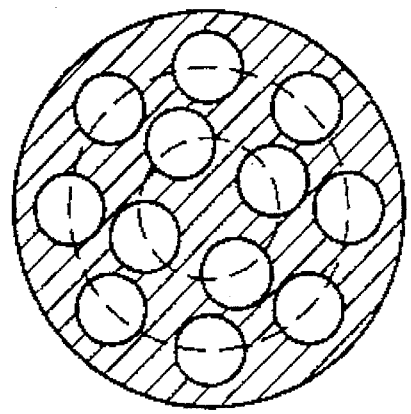
Figure 1C:
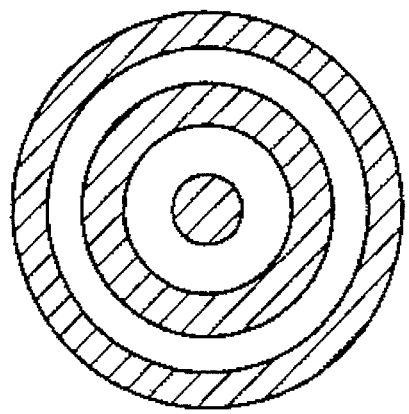

More particularly according to the present invention, by "reaction zone" is intended that zone of the reactor exhibiting temperature compatibility with the carbonitriding reaction of alumina, such temperature typically ranging from 1,350° to 2,000° C.

By "exchange surface area" is intended the surface area of the internal wall(s) of the conduit(s) defining the reaction zone.

In a first embodiment of the process of the present invention, the reaction among alumina, carbon and nitrogen is carried out in a reactor operating continuously by addition of successive charges of starting materials.

In a preferred embodiment, the reaction among alumina, carbon and nitrogen is carried out in a moving-bed reactor.

In the first embodiment, a reactor operating by addition of successive charges is employed, constructed of at least one linear conduit, generally made of graphite, intended to be operated in a substantially vertical configuration. The reactor is charged with granules prepared by shaping a paste comprising a mixture of alumina and of carbon and, advantageously, especially to facilitate the compounding of this paste, of a binder optionally serving as a complementary raw-material(s) carrier.

By "binder" is intended any material which imparts to the granules a mechanical strength compatible with the process according to the invention. Generally, this mechanical strength is determined by measuring the crush strength and the attrition weight loss of the granules.

When the binder comprises a thermosetting resin that generates carbon during pyrolysis thereof, the amounts of carbon and thermosetting resin are adjusted such as to conjointly impart to the granules both sufficient porosity and sufficient mechanical strength.

Carbon black provides the pore volume favorable to the rate of carbonitriding and the resin consolidates the granules.

The thermosetting resin is advantageously selected from among the phenol/formaldehyde resins in aqueous solution; other resins, however, can also be used, such as epoxy, polyester or polyimide resins.

The carbon black may be selected from among a wide range of carbon blacks, as long as the average diameter of the particles thereof ranges from 0.5 to 10 μm and preferably from 1 to 5 μm and as long as the pore volume thereof is at least equal to 0.3 $cm^3/g$. Particularly exemplary of such carbon blacks is acetylene black, the pore volume of which may be as high as 10 $cm^3/g$.

As regards the alumina, a high-purity alumina is advantageously selected, having a grain size on the same order of magnitude as those of the carbon black. For the compounding of the paste (and of the granules) and for purposes of homogeneity, a dispersant is advantageously included, for example of the type comprising an ammonium salt of a polyacrylic acid.

In the compounding of the granules, a total-carbon quantity is generally employed, namely, carbon as is and carbon generated by the thermosetting resin equal to or greater than the stoichiometry of the carbonitriding reaction ($C/Al_2O_3$ ratio=3). This excess may be as high as 100% and preferably ranges from 0% to 50%.

These feed or starting material granules have a crushing strength generally ranging from 0.2 to 3 MPa (measured according to the "Bulk Crushing Strength"—Shell technique) and an attrition weight loss generally less than 15%. This attrition weight loss is measured according to the technique which entails introducing 25 g of granules into a closed cylindrical metal tube (internal diameter 36 mm, length 305 mm), and fixing the tube to a rotating support in such manner that the axis of rotation of the support passes through the middle of the length of the tube. After 1 hour of treatment at a speed of 25 rpm, the solids obtained are screened (425 μm screen), and the fines are recovered and weighed.

The attrition loss is expressed by the relationship:

$$A\% = (P2/P1) \times 100$$

in which A% represents the attrition weight loss; P1 represents the initial weight of the granules; and P2 represents the weight of fines obtained.

Percolation or fluidization of the charge by nitrogen is advantageously achieved by continuous inlet of the gas at the bottom portion of the conduit(s) of the reactor.

The top part or upper end of the conduit(s) of the reactor is connected to a manifold for the outlet gases, these gases essentially being CO and $N_2$ in excess. Such gases may optionally be transported to the base of an incineration furnace.

After a sufficient reaction time for the carbonitriding reaction to be complete, granules, which may contain an excess of carbon (AlN+C), are recovered after cooling, said granules having a residual $\alpha$-$Al_2O_3$ content generally less than 0.5% with respect to AlN (measurement carried out by X-ray diffraction). For example, such reaction time can range from 0.5 to 25 hours.

The excess carbon may be removed by combustion in an oxygen-containing gas, preferably at a temperature not exceeding 700° C.

The pure aluminum nitride is lastly deagglomerated, for example in an air-jet mill advantageously equipped with a grinding chamber coated with elastomer, to prevent any contamination thereof.

The aluminum nitride powder prepared via the process described hereinabove is in the form of particles of average size ranging from 0.5 to 5 μm, comprising AlN with a residual $\alpha$-$Al_2O_3$ content not exceeding 0.5% (by weight with respect to AlN) and a BET specific surface area generally at least equal to 2 $m^2/g$ and even attaining a value of up to 5 $m^2/g$.

In the second and preferred embodiment of the process of the invention, the subject reaction is carried out in a moving-bed reactor.

By "moving bed" is intended the conventional definition, i.e., a reactor of the plug-flow type.

More particularly, the reaction between alumina, carbon and nitrogen is carried out in a moving-bed reactor operating at a constant filling rate, with a homogeneous and constant residence time of the reactants and with percolation of the charge under conditions ensuring homogeneous composition of the gas phase around each particle at a given level and intense mass transfer and heat exchange.

In this embodiment, the constant fill rate may be attained by continuous extraction, for example by a weight-metering or volume-metering device situated at the base of the moving bed, and a plug-type flow of the charge in a shell of constant cross section.

In the process of this invention, and whatever the type of reactor selected, the reactor provides at least the functions:

(a) of heating the starting material granules (shaped raw materials), by the hot outlet gases, namely, emanating from a heat exchanger, (b) of a carbonitriding reaction zone, and (c) of heating the nitrogen entering the reactor by contact with the granules exiting the hot zone of the kiln.

The reactor typically comprises a single conduit, all or a portion of which constituting or defining the reaction zone.

The cross section of the conduit in the reaction zone may have a regular or arbitrary shape. Exemplary of a regular shape are circles, ellipses, annuli, right or curvilinear polygons, either regular or irregular, and geometrical shapes having an axis of symmetry. Preferably, a conduit having a cross section of circular shape is employed.

The reaction zone may also comprise a plurality of conduits, whether identical or different, the cross sections of which may have a shape as indicated above.

When the reaction zone comprises several conduits, these conduits may be uniformly or non-uniformly arranged inside the reactor. Generally, the conduits are uniformly arranged such that, for example, the center of each conduit is located on a circle or several concentric circles whose origin is the center of the reactor, or by nesting when this involves annuli of various sizes (see the Figure of Drawing). Preferably, the conduits are arranged such that the center of each conduit is located on a circle whose origin is the center of the reactor.

The space between the conduits typically comprises a heat-conducting material. Exemplary thereof are graphite, tungsten and molybdenum. Preferably, such heat-conducting material is the same material as that which forms the conduits, generally graphite.

When the reaction zone comprises a plurality of conduits, the nitrogen-heating zone, contiguous with said reaction zone, may or may not also be constituted by only a single conduit or, more generally, by a different number of conduits and/or by one or more conduits of different shape(s) and/or size(s).

Generally, the base or bottom part of the reactor is extended by a shell of frustoconical shape comprising a nitrogen feed and the bottom or distal end of this shell is provided with a sealed volume-metering device permitting extraction of the granules with a view to their continuous weighing.

The level of the fresh granules continuously being charged into the reactor is maintained constant by means of a sensor establishing the filling level, this sensor being situated in the top end of the reactor.

The hot carbonitrided granules, which descend to the base of the reactor, are progressively cooled by the inlet nitrogen continuously introduced. The cold granules are extracted or removed by means of the volume-metering device described above.

Cold granules are thus recovered which can contain an excess of carbon (AlN+C), said granules having a residual $\alpha$-$Al_2O_3$ content of less than 0.5% with respect to AlN (measurement carried out by X-ray diffraction).

The excess carbon may be removed by combustion in a gas containing oxygen, preferably at a temperature not exceeding 700° C.

The pure aluminum nitride is finally deagglomerated, for example in an air-jet mill advantageously equipped with a grinding chamber coated with elastomer, to prevent any contamination.

The aluminum nitride powder obtained by the process of the invention is in the form of particles of average size ranging from 0.5 to 5 μm, comprising AlN having a residual $\alpha$-$Al_2O_3$ content not exceeding 0.5% (by weight with respect to AlN) and BET specific surface area at least equal to 2 $m^2/g$ and possibly even up to 5 $m^2/g$.

In order to further illustrate the present invention and the advantages thereof, the following specific examples are given, it being understood that same are intended only as illustrative and in nowise limitative.

EXAMPLE 1

1. 550 parts by weight of high-purity alumina, finely ground (average grain size: 1 μm—ASTM C678 Standard:

pore volume: 0.76 cm³/g) were mixed with 182 parts by weight of acetylene black (average particle size: 2 to 3 µm: pore volume: 7.0 cm³/g), 257 parts by weight of phenol/formaldehyde resin in aqueous solution (approximately 60% concentration) and 11 parts by weight of an ammonium polyacrylate dispersant.

The mixture was processed in an alumina-coated mixer until the white particles of alumina disappeared.

The resulting paste was charged into an extruding press whose extrusion orifices had a diameter of 3 mm. At the outlet of these orifices, a cutter cut the rods to a length of 6 mm.

The granules thus obtained, dried in a ventilated oven at 150° C., (10.8% weight loss), had the following composition by weight:

| (i)   | alumina    | 61.6% |
|-------|------------|-------|
| (ii)  | carbon     | 20.4% |
| (iii) | resin      | 17.5% |
| (iv)  | dispersant | 0.5%  |

The crush strength of the granules was 2.8 MPa and the attrition weight loss was equal to 2.2%.

2. The granules were charged into a continuously operating flowing or moving-bed graphite reactor. The reactor was constituted by a cylindrical conduit, the reaction zone of which had an internal diameter of 300 mm, this corresponding to an exchange surface area/volume ratio equal to 13 m$^{-1}$.

The feed rate of the granules was 4.2 kg/h.

The reactor was fed at its bottom part with nitrogen at a flow rate of 16 kg/h.

The temperature of the external wall of the reaction zone was 1,450°–1,700° C., the residence time in this zone being approximately 12 hours.

Upon exiting the reaction zone, the cold carbonitrided granules were removed at a rate of 2.40 kg/h (this corresponding to 2.04 kg/h of 100% aluminum nitride).

Under these conditions, the productivity of the reactor was equal to 0.0412 kg of 100% aluminum nitride per hour and per liter of reaction zone.

3. The granules were recovered and spread onto Inconel trays in a layer of approximately 1 cm in thickness which were then loaded into an electrically heated discontinuous kiln, the temperature being maintained uniform at 650° C.±5° C. by circulation of air. This temperature was maintained for 8 hours. The weight loss was approximately 12.5%.

After this treatment, the residual free carbon content was less than 700 ppm, the oxygen content not exceeding 1%.

The aluminum nitride thus obtained was deagglomerated in an air-jet mill having walls coated with elastomer.

The average size of the particles of the final product aluminum nitride was 1 µm and the BET specific surface area of this aluminum nitride was 4 m²/g.

EXAMPLE 2

The conditions/procedure of Example 1 were established in a reactor whose reaction zone was defined by four conduits of circular cross section, inscribed in a 300 mm diameter circle. Each conduit had a diameter of 110 mm, defining an exchange surface area/volume ratio equal to 36 m$^{-1}$.

The feed rate of the granules was 4.05 kg/h.

The reactor was charged at its base end with nitrogen at a flow rate of 24 kg/h.

The residence time in the reaction zone was approximately 7 hours.

Upon exiting the reaction zone, the cooled carbonitrided granules were removed at a rate of 2.3 kg/h (this corresponding to 2.0 kg/h of 100% aluminum nitride).

Under these conditions, the productivity of the reactor was equal to 0.075 kg of 100% aluminum nitride per hour and per liter of reaction zone.

EXAMPLE 3 (COMPARATIVE)

The conditions/procedure of Example 1 were repeated in a graphite reactor whose reaction zone was defined by a conduit of circular cross-section having a diameter of 800 mm, this corresponding to an exchange surface area/volume ratio equal to 5 m$^{-1}$.

The nitrogen feed rate was 20 kg/h.

The feed rate of granules was 5 kg/h, this corresponding to 2.5 kg/h of 100% aluminum nitride.

The residence time in the reaction zone was approximately 90 hours.

Under these conditions, the productivity of the reactor was equal to 0.007 kg of 100% aluminum nitride per hour and per liter of reaction zone.

EXAMPLE 4

The conditions/procedure of Example 1 were repeated, the alumina carbonitriding being carried out in the reaction zone of a reactor operating continuously by successive charges.

45 kg of granules were introduced into the reaction zone of the reactor per sequence.

The temperature of the external wall of the reaction zone was 1,500° C.

The residence time in the reaction zone was approximately 23 hours.

When the carbonitriding reaction was complete, the granules were removed and the reaction zone was filled once again with fresh granules.

During this removal/filling operation, which was accomplished in approximately one hour, the temperature of the external wall of the reaction zone was maintained constant, at approximately 1,500° C.

Under these conditions, the productivity of the reactor was equal to 0.023 kg of 100% aluminum nitride per hour and per liter of reaction zone.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the continuous production of aluminum nitride, which comprises continuously carbonitriding a continuously replenished charge of alumina in a reaction zone comprising at least one conduit, the ratio of the exchange surface area/volume of said at least one conduit ranging from 5 to 150 m$^{-1}$, and continuously withdrawing product AlN therefrom.

2. The process as defined by claim 1, said exchange surface area/volume ratio ranging from 10 to 50 m$^{-1}$.

3. The process as defined by claim 1, said at least one conduit having a cross section of a shape selected from the group consisting of circles, ellipses, annuli, right or curvilinear polygons, whether regular or irregular, and geometrical shapes having an axis of symmetry.

4. The process as defined by claim 1, said continuously replenished charge of alumina comprising successive charges of alumina/carbon extrudates.

5. The process as defined by claim 4, said alumina/carbon extrudates comprising a binder therefor, and having a crush strength ranging from 0.2 to 3 MPa and an attrition weight loss of less than 15%.

6. The process as defined by claim 1, said at least one conduit comprising a moving-bed reaction zone.

7. The process as defined by claim 1, carried out at a temperature ranging from 1,350° C. to 2,000° C.

8. The process as defined by claim 1, comprising reacting a carbon black and nitrogen gas with alumina.

9. The process as defined by claim 8, said carbon black having a particle size ranging from 0.5 to 10 μm and a pore volume of at least 0.3 cm$^3$/g.

10. The process as defined by claim 5, said alumina/carbon extrudates also comprising a dispersant.

11. The process as defined by claim 1, said at least one conduit being essentially vertical.

12. The process as defined by claim 1, comprising countercurrently introducing nitrogen gas into said at least one conduit.

* * * * *